Patented Dec. 8, 1942

2,304,166

UNITED STATES PATENT OFFICE 2,304,166

METHOD OF PRODUCING MACHINED CARBON ARTICLES

Marcus R. Hatfield, Lakewood, Ohio, assignor to National Carbon Company, Inc., a corporation of New York No Drawing. Application August 13, 1940, Serial No. 352,475

3 Claims. (Cl. 18—48)

This invention relates to the preparation of carbon articles by machining or other cutting methods and has for its principal objects a method of producing a shaped carbon article having surfaces of improved smoothness, and a method of improving the strength of carbon articles which are to be machined or otherwise cut.

One method of making carbon articles comprises mixing carbon particles with carbonaceous binder such as pitch or tar, forming the mixture to a desired shape, and then baking the mixture. The baking operation drives volatile material from the mixture and converts a part or all of the carbonaceous binder materials to solid carbon. Baked carbon articles produced in this way are always porous to some extent, because some degree of porosity is unavoidable, and sometimes because definitely controlled, highly porous articles are intentionally made.

Often it is desired to machine or cut articles produced in this manner (referred to herein as "baked carbon articles") to produce shapes inconveniently made in other ways. Baked carbon articles are readily cut, but it is difficult to produce smooth cut surfaces on the more porous types of carbon articles, because particles of carbon are easily chipped out of such articles by a machining or grinding operation. Moreover, carbon is not very strong in thin sections and is liable to break during machining.

These difficulties are obviated by the present invention which comprises impregnating the surface portion or portions of a carbon article to be machined with an easily removable material prior to such machining; machining or otherwise cutting the impregnated article; and then removing the impregnant from the shaped article. Suitable impregnating materials include materials which may be removed by burning or by chemical reaction, volatilizable materials, for example naphthalene or sulphur, and soluble materials such as metals, for example silver, which may be dissolved by treating the impregnated article with an acid or other solvent. Materials which have been successfully used include collodion and "A" stage phenolic resins of the thermosetting type. Of the impregnants mentioned, naphthalene is ordinarily preferred since it may be volatilized at a low temperature (218° C.) and may be completely removed from the article with ease.

The step of impregnating carbon articles in the process of the invention may be carried out in any known manner, for example by dipping the article in molten impregnant or in a solution of the impregnant. It may sometimes be desirable to carry out the impregnation by placing the article in contact with impregnating solution in a vacuum, releasing the vacuum and forcing the impregnating solution into the article by atmospheric or superatmospheric pressure. It is necessary to impregnate the article only to the depth to which it is to be machined, but if desired, the article may be impregnated throughout its entire mass.

Material which has been impregnated according to the invention may be readily machined or cut, and the individual particles of carbon are cut through rather than chipped out of the article, making it possible to obtain a smooth surface on such articles by machining or cutting. The strength of carbon articles treated in accordance with the invention may be increased twofold by impregnation, and because of this increase in strength it is possible to prepare carbon articles of extremely thin section without the danger of excessive breakage.

After the impregnated article is machined, the impregnant is removed by subjecting the article to heat to volatilize or burn the impregnant; or the article may be treated with a solvent for the impregnant to dissolve the impregnant. It is desirable to remove the impregnant completely so that the finished article has the desired porosity.

While specific examples of suitable impregnating agents have been cited, the invention is not limited to the use of any of these materials, any material which does not have a deleterious effect on carbon, which penetrates the article to be treated, and which may be readily removed may be used.

The term "machining" as used in this specification and in the appended claims includes sawing, grinding, or other cutting operations.

I claim:

1. A method of producing a machined carbon article which comprises impregnating with a removable impregnant which is a machinable rigid solid at ordinary room temperatures a carbon article to be machined, machining the impregnated article, and removing the impregnant.

2. A method of producing a machined carbon article which comprises impregnating a porous carbon article with an acid-soluble machinable metal impregnant, machining the impregnated article, and dissolving and removing the impregnant with acid.

3. A method of producing a machined carbon article which comprises impregnating with naphthalene a carbon article to be machined, machining the impregnated article, and then volatilizing and removing the naphthalene.

MARCUS R. HATFIELD.